United States Patent
Lim et al.

(10) Patent No.: US 8,705,885 B2
(45) Date of Patent: Apr. 22, 2014

(54) DEPTH IMAGE ENCODING APPARATUS AND DEPTH IMAGE DECODING APPARATUS USING LOOP-FILTER, METHOD AND MEDIUM

(75) Inventors: Il Soon Lim, Chungcheongnam-Do (KR); Ho Cheon Wey, Seongnam-si (KR); Byung Tae Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 310 days.

(21) Appl. No.: 13/067,679

(22) Filed: Jun. 20, 2011

(65) Prior Publication Data

US 2012/0002863 A1 Jan. 5, 2012

(30) Foreign Application Priority Data

Jul. 2, 2010 (KR) ........................ 10-2010-0063834

(51) Int. Cl.
- *G06K 9/40* (2006.01)
- *G06K 9/00* (2006.01)
- *G06K 9/36* (2006.01)
- *H04N 7/12* (2006.01)

(52) U.S. Cl.
USPC ...................... 382/266; 382/154; 375/240.29

(58) Field of Classification Search
USPC ................. 382/233, 260–269, 312, 274–275; 348/27; 375/240.24, 240.27, 240.29, 375/254
See application file for complete search history.

(56) References Cited

U.S. PATENT DOCUMENTS

| | | | | |
|---|---|---|---|---|
| 7,956,886 B2 * | 6/2011 | Murayama | ...................... | 348/42 |
| 8,189,943 B2 * | 5/2012 | Yea et al. | ...................... | 382/257 |
| 8,265,144 B2 * | 9/2012 | Christoffersen et al. | .. | 375/240.1 |
| 8,270,752 B2 * | 9/2012 | Yea et al. | ...................... | 382/260 |
| 8,384,763 B2 * | 2/2013 | Tam et al. | ...................... | 348/43 |
| 8,391,353 B2 * | 3/2013 | Yin et al. | ...................... | 375/240 |

FOREIGN PATENT DOCUMENTS

| | | |
|---|---|---|
| JP | 2008-42745 | 2/2008 |
| KR | 10-0793076 | 1/2008 |
| KR | 10-0922275 | 6/2008 |
| KR | 10-2009-0088129 | 8/2009 |

* cited by examiner

*Primary Examiner* — Kanjibhai Patel
(74) *Attorney, Agent, or Firm* — Staas & Halsey LLP

(57) ABSTRACT

A depth image encoding apparatus and a depth image decoding apparatus are provided. The depth image encoding apparatus may compute coefficients used to restore an edge region and a smooth region of a depth image, and may restore the depth image using the depth image and a color image.

5 Claims, 14 Drawing Sheets

DEPTH IMAGE ENCODING APPARATUS AND DEPTH IMAGE DECODING APPARATUS USING LOOP-FILTER, METHOD AND MEDIUM

CROSS-REFERENCE TO RELATED APPLICATIONS

This application claims the benefit of Korean Patent Application No. 10-2010-0063834, filed on Jul. 2, 2010, in the Korean Intellectual Property Office, the disclosure of which is incorporated herein by reference.

BACKGROUND

1. Field

Example embodiments of the following description relate to a depth image encoding apparatus and a depth image decoding apparatus using a loop filter and, more particularly, to a depth image encoding apparatus and a depth image decoding apparatus using a loop filter that may restore a depth image with greater clarity during encoding or decoding the depth image.

2. Description of the Related Art

A stereographic image may include a color image and a depth image. To provide a user with a stereographic image, a three-dimensional (3D) compression system may compress a color image and a depth image. The color image may be efficiently compressed, for example, by using a Moving Picture Experts Group-4 (MPEG-4) standard and an H.264/Advanced Video Coding (AVC) standard. However, since the depth image includes a smooth region and discontinuous edge regions, a quality of the depth image may be significantly reduced due to a degradation in the discontinuous edge regions.

SUMMARY

The foregoing and/or other aspects are achieved by providing a depth image encoding apparatus, including a parameter determination unit to determine filtering parameters, the filtering parameters being used to restore an edge region of a depth image, a determination unit to determine a correlation between the depth image and a color image, the color image being matched to the depth image, and a restoring unit to filter the edge region based on the determined correlation, and to compensate for and restore the edge region.

The filtering parameters may include a domain variance used to adjust a smoothing strength of a smooth region of the depth image, a range variance used to adjust a smoothing strength of the edge region, and a color parameter used to compensate for the smoothing strength of the edge region.

The determination unit may include a detection unit to detect a color boundary strength of a pixel located in the color image, and a depth boundary strength of a pixel located in the depth image, and a correlation determination unit to compare a threshold, set in advance, with the detected color boundary strength and the detected depth boundary strength, and to determine the correlation.

The restoring unit may include a computation unit to compute an edge compensation filter coefficient using the color image, the edge compensation filter coefficient being used to compensate for the edge region, and a filtering unit to filter the edge region using the computed edge compensation filter coefficient.

The computation unit may compute the edge compensation filter coefficient using at least one of the determined filtering parameters, and using the detected color boundary strength and the detected depth boundary strength.

The computation unit may compute the edge compensation filter coefficient, when the correlation is determined to be high by the correlation determination unit.

The computation unit may further compute a smooth compensation filter coefficient used to compensate for the smooth region, and an edge preserving filter coefficient used to preserve the edge region. The filtering unit may filter the edge region further using the smooth compensation filter coefficient and the edge preserving filter coefficient.

The restoring unit may restore the smooth region of the depth image using the determined filtering parameters, when the correlation is determined to be low by the correlation determination unit.

The restoring unit may include a computation unit to compute a smooth compensation filter coefficient and an edge preserving filter coefficient using the determined filtering parameters, when the correlation is determined to be low by the correlation determination unit, the smooth compensation filter coefficient being used to compensate for the smooth region, and the edge preserving filter coefficient being used to preserve the edge region, and a filtering unit to filter the smooth region using the computed smooth compensation filter coefficient and the computed edge preserving filter coefficient.

The foregoing and/or other aspects are also achieved by providing a depth image encoding apparatus, including a parameter determination unit to determine filtering parameters, the filtering parameters being used to restore a smooth region and an edge region of a depth image, and a restoring unit to filter the depth image using the determined filtering parameters, and to compensate for and restore the smooth region and the edge region.

The foregoing and/or other aspects are also achieved by providing a depth image encoding apparatus, including a dividing unit to divide a depth image into a plurality of blocks, a flatness computation unit to compute a flatness of each of the plurality of blocks, and a restoring unit to filter the plurality of blocks using different filtering parameters based on the computed flatness, and to compensate for and restore a smooth region and an edge region of the depth image.

The foregoing and/or other aspects are also achieved by providing a depth image decoding apparatus, including an input unit to receive an input of filtering parameters, the filtering parameters being used to restore a smooth region and an edge region of a depth image, a determination unit to determine a correlation between the depth image and a color image, the color image being matched to the depth image, and a restoring unit to filter the depth image based on the determined correlation, and to compensate for and restore the smooth region and the edge region, wherein the restoring unit filters the edge region using the received filtering parameters.

The foregoing and/or other aspects are also achieved by providing a depth image decoding apparatus, including an input unit to receive an input of filtering parameters, the filtering parameters being used to restore a smooth region and an edge region of a depth image, and a restoring unit to filter the depth image using the received filtering parameters, and to compensate for and restore the smooth region and the edge region.

The foregoing and/or other aspects are achieved by providing a depth image processing method including obtaining smooth and edge filter parameters for restoring a depth image, determining whether a pixel correlates to an edge pixel, computing edge compensation, smooth compensation and edge preservation filter coefficients using the parameters responsive to the determining and filtering the pixel with the coefficients responsive to the determining.

The foregoing and/or other aspects are achieved by providing a non-transitory computer readable medium including program instructions for a depth image processing method including computing edge compensation, smooth compensation and edge preservation filter coefficients using parameters for restoring a depth image responsive to the determining, and filtering a pixel of the image with the coefficients responsive to whether a pixel correlates to an edge pixel to the determining Additional aspects, features, and/or advantages of example embodiments will be set forth in part in the description which follows and, in part, will be apparent from the description, or may be learned by practice of the disclosure.

The example embodiments may include a depth image encoding apparatus and a depth image decoding apparatus using a loop filter that may filter a depth image using the depth image and a color image, or may filter the depth image without using the color image, thereby improving a quality of the depth image, a quality of a synthesized image viewed from a predetermined viewpoint, and a compression ratio in a moving image compression system.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
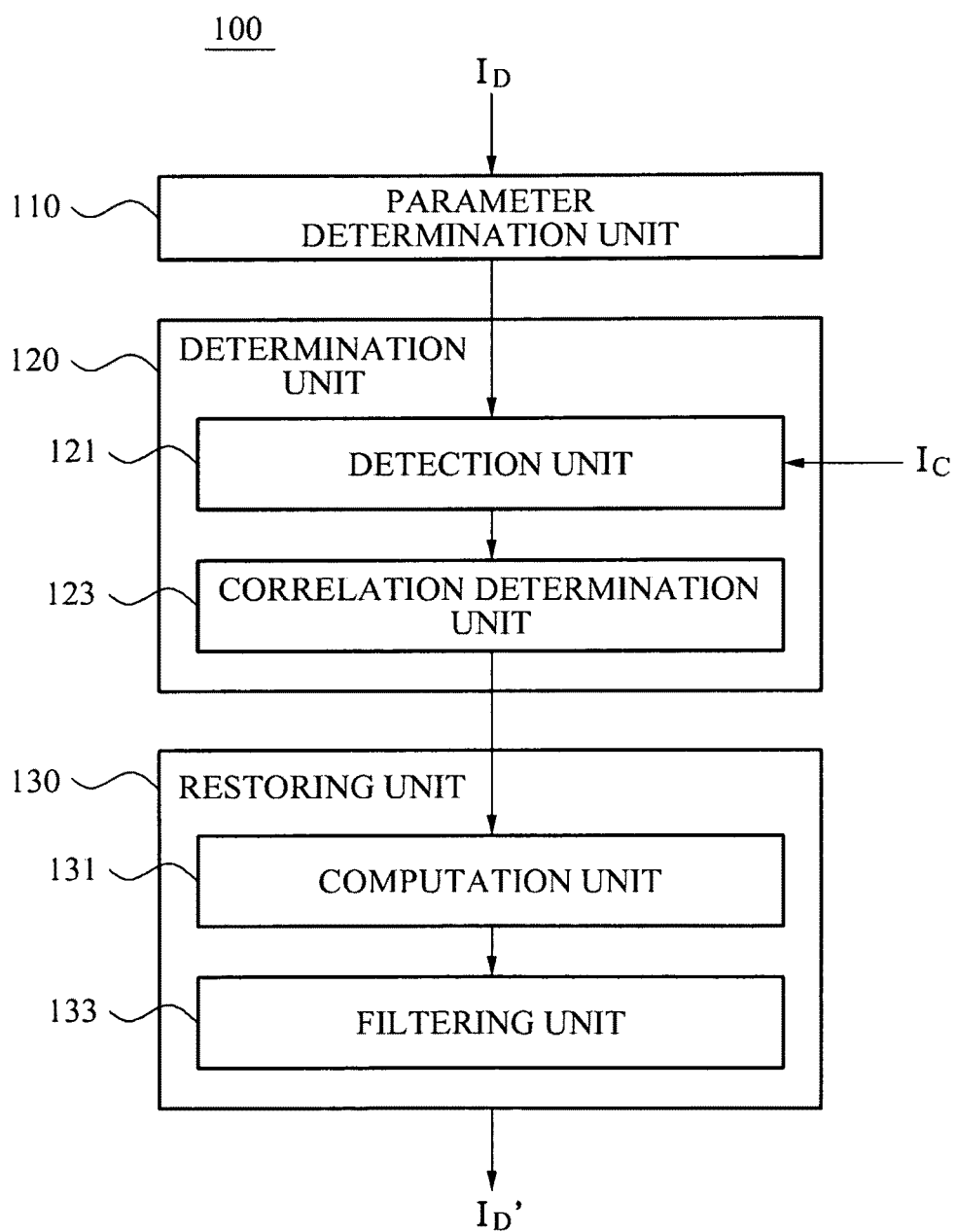
FIG. 1 illustrates a block diagram of an example of a depth image encoding apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a depth image encoding apparatus 100 according to example embodiments.

Referring to FIG. 1, the depth image encoding apparatus 100 includes a parameter determination unit 110, a determination unit 120, and a restoring unit 130. A depth image may include an edge region and a smooth region. The depth image encoding apparatus 100 may compensate for and preserve the edge region of the depth image using an encoded depth image $I_D$ and an encoded color image $I_C$, and may restore the smooth region of the depth image.

The parameter determination unit 110 may determine filtering parameters used to restore the edge region and the smooth region of the depth image. Here, the depth image may be compressed by an encoder (not shown), may be decompressed, and then may be input to the parameter determination unit 110.

The determined filtering parameters may include a domain variance $\sigma_{domain}$ used to adjust a smoothing strength of a smooth region of a depth image, a range variance $\sigma_{range}$ used to adjust a smoothing strength of an edge region of the depth image, and a color parameter $p_{color}$ used to compensate for the smoothing strength of the edge region. The determined filtering parameters may be provided to a decoding apparatus, and may be used to decode the depth image.

The parameter determination unit 110 may determine an optimal domain variance, an optimal range variance, and an optimal color parameter, in order to increase a compression ratio of the depth image, and to preserve the edge region of the restored depth image. The parameter determination unit 110 may determine the filtering parameters for each inter/intra frame or for each picture of an input depth image.

Generally, when a compressed image is restored as closely as possible to an original image, and when the restored image is used as a reference image, the compression ratio may be increased. Accordingly, the parameter determination unit 110 may determine the filtering parameters using a "distortion minimization scheme" to minimize a Sum of Squared Difference (SSD). The distortion minimization scheme is described below.

First, the parameter determination unit 110 may form combinations of three parameters in an available range of each filtering parameter, and may calculate an SSD for each of the formed combinations. Here, the SSD refers to a square of a difference between a received original depth image, and a compressed depth image.

For example, it may be assumed that an available range of a domain variance is set from $\sigma_{domain,1}$ to $\sigma_{domain,L}$, that an available range of a range variance is set from $\sigma_{range,1}$ to $\sigma_{range,M}$, and that an available range of a color parameter is set from $p_{color,1}$ to $p_{color,N}$. In this example, the parameter determination unit 110 may form all available combinations in the ranges. For example, the parameter determination unit 110 may form combinations such as a combination of a $\sigma_{domain,1}$, $\sigma_{range,1}$, $p_{color,1}$, a combination of a $\sigma_{domain,1}$, $\sigma_{range,1}$, $p_{color,2}$, ..., a combination of $(\sigma d_{omain,1}, \sigma_{range,1}, p_{color,1})$, and the like.

The parameter determination unit 110 may calculate an SSD for each of the combinations, and may determine parameters of a combination having a smallest SSD as optimal filtering parameters.

The determination unit 120 may determine a correlation between the depth image and a color image that is matched to the depth image. The determination unit 120 may include a detection unit 121, and a correlation determination unit 123.

The detection unit 121 may receive the filtering parameters determined by the parameter determination unit 110, the depth image, and the color image matched to the depth image. The detection unit 121 may detect a color boundary strength $b_{color}$ of a pixel located in the color image, and a depth boundary strength $b_{depth}$ of a pixel located in the depth image. Specifically, the detection unit 121 may detect a color boundary strength of a pixel at a coordinate (x, y) of the color image, and a depth boundary strength of a pixel at a coordinate (x, y) of the depth image. For example, the detection unit 121 may use an edge detector, such as the Prewitt edge detector, the Sobel edge detector, the Canny edge detector, and the like.

The correlation determination unit 123 may compare a threshold set in advance, with the detected color boundary strength and the detected depth boundary strength, and may determine the correlation between the depth image and the color image. The correlation determination unit 123 may compare the color boundary strength with a first threshold TH1. When the color boundary strength is equal to or greater than the first threshold TH1, the correlation determination unit 123 may compare the depth boundary strength with a second threshold TH2. When the depth boundary strength is equal to or greater than the second threshold TH2, the correlation determination unit 123 may determine that a pixel at the coordinate (x, y) of the depth image has a high correlation to a pixel at the coordinate (x, y) of the color image. There is a high probability that pixels determined to have high correlation are pixels of an edge region.

The restoring unit 130 may compensate for and restore the edge region of the depth image so that the edge region may be preserved. The restoring unit 130 may filter the edge region of the depth image based on the determined correlation. Specifically, the restoring unit 130 may filter pixels determined to have high correlation, and may preserve edges of the pixel. Here, the restoring unit 130 may use a loop filter, and may include a computation unit 131 and a filtering unit 133.

When the correlation is determined to be high by the correlation determination unit 123, the computation unit 131 may compute an edge compensation filter coefficient. The edge compensation filter coefficient may be a value used to compensate for the edge region. The computation unit 131 may compute the edge compensation filter coefficient using the color image matched to the depth image. Since the edge compensation filter coefficient is proportional to a boundary strength, namely an edge strength, the edge region may be more accurately compensated for and preserved using the edge compensation filter coefficient. Accordingly, the computation unit 131 may compute the edge compensation filter coefficient using at least one of the filtering parameters, and using the detected color boundary strength, and the detected depth boundary strength. Here, a performance of compensating for the edge region may be significantly influenced by the color parameter $p_{color}$.

The computation unit 131 may compute an edge compensation filter coefficient using the following Equation 1:

$$c(x,y,p_{color}) = p_{color} \cdot b_{depth}(x,y) \cdot b_{color}(x,y) \quad \text{[Equation 1]}$$

Referring to Equation 1, $c(x, y, p_{color})$ denotes an edge compensation filter coefficient that is to be applied to a pixel at a coordinate (x, y), and $p_{color}$ denotes a proportionality constant. Additionally, $b_{depth}(x,y)$ denotes a depth boundary strength of a pixel at a coordinate (x, y) of a depth image, and $b_{color}(x,y)$ denotes a color boundary strength of a pixel at a coordinate (x, y) of a color image. The edge compensation filter coefficient may be proportional to the depth boundary strength and the color boundary strength.

Here, $c(x, y, p_{color})$ may be used in a filter for compensating for an edge region of the depth image. Specifically, $c(x, y, p_{color})$ may be used to compensate for an edge of an area of a depth image having a high correlation to a color image. Accordingly, it is possible to prevent a color image having no correlation to the depth image from being used.

Additionally, the computation unit 131 may further compute a smooth compensation filter coefficient and an edge preserving filter coefficient, using the filtering parameters. Here, the smooth compensation filter coefficient may be used to compensate for a smooth region, and the edge preserving filter coefficient may be used to preserve an edge region. The smooth compensation filter coefficient and the edge preserving filter coefficient may be respectively computed using the following Equations 2 and 3:

$$g(x, y, \sigma_{domain}) = e^{-\frac{x^2+y^2}{2\sigma_{domain}^2}} \quad \text{[Equation 2]}$$

Referring to Equation 2, the smooth compensation filter coefficient may be influenced by a coordinate (x, y) and a domain variance. In other words, the smooth compensation filter coefficient may be computed by a mathematical function of x and y, that is a domain distance. Additionally, the domain variance may be a parameter used to determine the smooth compensation filter coefficient.

$$r(x, y, \sigma_{range}) = e^{-\frac{\{f(a_i)-f(a)\}^2}{2\sigma_{range}^2}} \quad \text{[Equation 3]}$$

Referring to Equation 3, the edge preserving filter coefficient may be influenced by a coordinate (x, y) and a range variance. Here, $a_i$ denotes a gray level of neighboring pixels around a target pixel at the coordinate (x, y). Accordingly, the edge preserving filter coefficient may be computed by a mathematical function of the target pixel and the neighboring pixels. Since the coordinate (x, y) remains unchanged, the smooth compensation filter coefficient and the edge preserving filter coefficient may be adaptively adjusted by the domain variance and the range variance, respectively.

Figure 2:
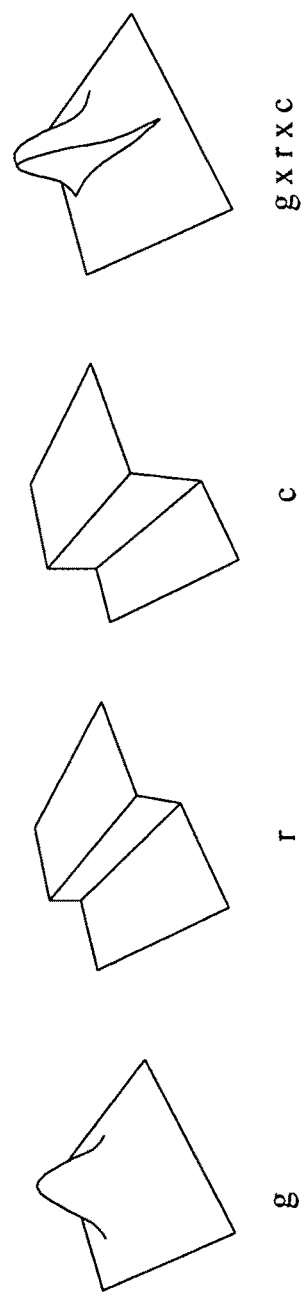
FIG. 2 illustrates a diagram of a smooth compensation filter coefficient, an edge preserving filter coefficient, and an edge compensation filter coefficient according to example embodiments.

FIG. 2 illustrates a diagram of a smooth compensation filter coefficient, an edge preserving filter coefficient, and an edge compensation filter coefficient.

Referring to FIG. 2, a filter 'g' may be used to filter a smooth region using a smooth compensation filter coefficient, and may have a Gaussian shape. The Gaussian shape may be changed based on the smooth compensation filter coefficient. Additionally, a filter 'r' may be used to filter an edge region using an edge preserving filter coefficient, and may have a stair shape. The stair shape may be changed based on the edge preserving filter coefficient.

The filtering unit 133 may perform a filtering operation to compensate for an edge region. The filtering unit 133 may perform the filtering operation using an edge compensation filter coefficient, a smooth compensation filter coefficient, and an edge preserving filter coefficient. Here, an edge region to be filtered refers to a target pixel at a coordinate (x, y). The filtering unit 133 may filter the edge region using the following Equation 4.

$$h = \sum_{i=1}^{n \times n} f(a_i) \times g(a_i) \times r(a_i) \times c(a_i) \qquad \text{[Equation 4]}$$

Referring to Equation 4, h denotes a pixel restored by filtering a pixel at a coordinate (x, y). Additionally, $g(a_i)$ denotes a smooth compensation filter coefficient, $r(a_i)$ denotes edge preserving filter coefficient, and c(a) denotes edge compensation filter coefficient. The filtering unit 133 may perform two-dimensional (2D) n×n filtering. Here, the filtering unit 133 may simultaneously perform the three filtering functions. Thus, the edge region may be restored without any change, rather than being blurred.

When the correlation is determined to be low by the correlation determination unit 123, the restoring unit 130 may determine that the target pixel corresponds to the smooth region. The restoring unit 130 may compensate for the smooth region of the depth image using the filtering parameters. Here, the computation unit 131 may compute a smooth compensation filter coefficient and an edge preserving filter coefficient, using the filtering parameters, and using Equations 2 and 3.

Additionally, the filtering unit 133 may filter the smooth region using the smooth compensation filter coefficient, the edge preserving filter coefficient, and Equation 4. Here, $c(a_i)$ Equation 4 may be set to be '1'. Thus, a compression noise of the target pixel may be removed, and the target pixel may be restored as the compensated smooth region.

The depth image encoding apparatus 100 may remove a compression noise that is usually shown in the smooth region, and may clearly compensate for and restore the edge region, so that the edge region of the restored depth image may be preserved. Accordingly, it is possible to improve a quality of the depth image, and improve a quality of a synthesized image viewed from a predetermined viewpoint.

Figure 3:
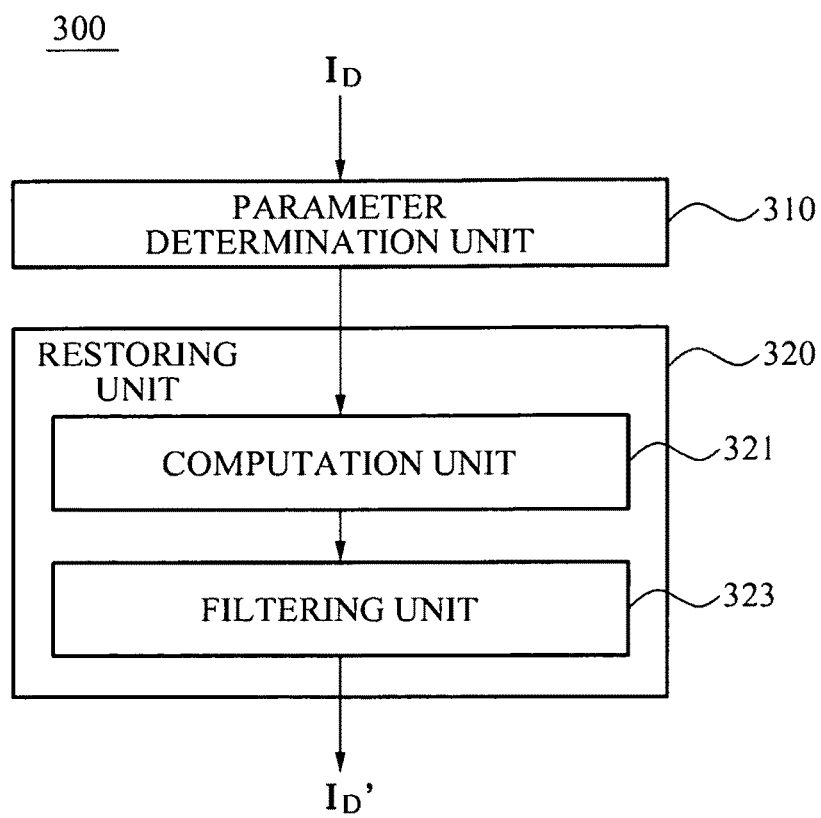
FIG. 3 illustrates a block diagram of another example of a depth image encoding apparatus according to example embodiments.

FIG. 3 illustrates a block diagram of a depth image encoding apparatus 300 according to example embodiments.

Referring to FIG. 3, the depth image encoding apparatus 300 includes a parameter determination unit 310, and a restoring unit 320. The parameter determination unit 310 and the restoring unit 320 of FIG. 3 may be similar to the parameter determination unit 110 and the restoring unit 130 of FIG. 1 and accordingly, further description thereof is omitted herein.

The depth image encoding apparatus 300 may restore a smooth region of an encoded depth image $I_D$, and may compensate for and preserve an edge region of the encoded depth image $I_D$, without using a color image $I_C$.

The parameter determination unit 310 may determine filtering parameters used to restore a smooth region and an edge region of the depth image. Here, the depth image may be compressed by an encoder (not shown), may be decompressed, and then may be input to the parameter determination unit 310. The filtering parameters determined by the parameter determination unit 310 may include a domain variance $\sigma_{domain}$ used to adjust a smoothing strength of the smooth region, and a range variance or $\sigma_{range}$ used to adjust a smoothing strength of the edge region.

The restoring unit 320 may filter the depth image using the determined filtering parameters, in order to compensate for and restore the depth image. Compensating and restoring of the depth image may mean preserving of the edge region and compensating of the smooth region. Accordingly, the restoring unit 320 may include a computation unit 321 and a filtering unit 323.

The computation unit 321 may compute a smooth compensation filter coefficient using Equation 2, and may compute an edge preserving filter coefficient using Equation 3. Here, the smooth compensation filter coefficient may be used to compensate for a smooth region, and the edge preserving filter coefficient may be used to preserve an edge region.

The filtering unit 323 may perform a filtering operation to compensate for and restore the depth image. Specifically, the filtering unit 323 may filter the depth image using the smooth compensation filter coefficient and the edge preserving filter coefficient. The filtering unit 323 may filter pixels of the edge region and pixels of the smooth region using Equation 4. Here, $c(a_i)$ in Equation 4 may be set to be '1'. Thus, a compression noise of the smooth region may be removed, and the smooth region may be compensated for and restored to be more flat, so that the edge region may be more clearly compensated for and preserved.

Figure 4:
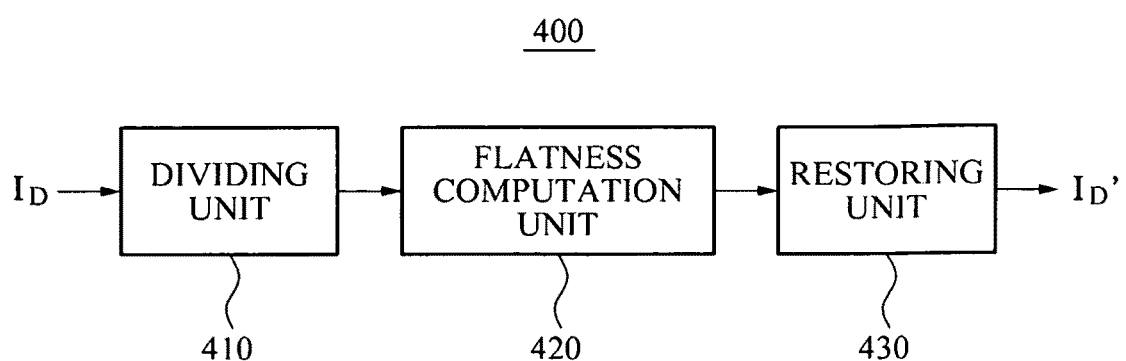
FIG. 4 illustrates a block diagram of still another example of a depth image encoding apparatus according to example embodiments.

FIG. 4 illustrates a block diagram of a depth image encoding apparatus 400 according to example embodiments.

The depth image encoding apparatus 400 may divide a depth image into blocks, and may selectively filter each of the blocks. The depth image encoding apparatus 400 may include a dividing unit 410, a flatness computation unit 420, and a restoring unit 430.

The dividing unit 410 may divide an input depth image into a plurality of blocks. For example, the dividing unit 410 may divide a depth image into macroblocks of 4×4, 8×8, 16×16, and the like.

The flatness computation unit 420 may compute a flatness of each of the plurality of blocks. In the depth image, a depth value of each pixel may be represented by a gray level. Accordingly, most of regions in the depth image may be smooth regions.

The restoring unit 430 may filter each of the plurality of blocks using different filtering parameters, based on the computed flatness. In other words, the restoring unit 430 may apply different filtering strengths based on the computed flatness. Accordingly, the restoring unit 430 may adaptively compensate for the smooth region, and may preserve and restore the edge region.

Figure 5:
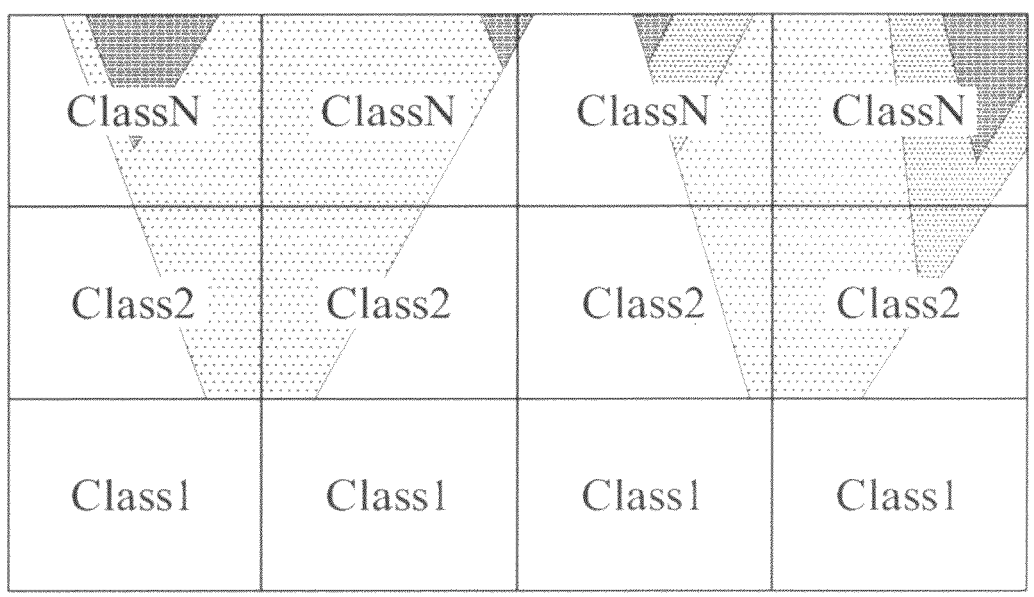
FIG. 5 illustrates a diagram of an example of classifying blocks of a depth image into classes according to example embodiments.

For example, the restoring unit 430 may classify the plurality of blocks into classes based on the computed flatness, as shown in Table 1. FIG. 5 illustrates a diagram of an example of classifying blocks of a depth image into classes. Referring to FIG. 5, a class 1 represents very flat blocks. Accordingly, the restoring unit 430 may not filter the blocks belonging to the class 1. Since blocks belonging to a class 2 are less flat than the blocks belonging to the class 1, the restoring unit 430 may filter the blocks belonging to the class 2 using a filter parameter (2) corresponding to the class 2.

TABLE 1

| Class | Flatness of blocks | Filtering strength |
|---|---|---|
| 1 | Very flat | No filtering |
| 2 | Flat | Filter parameter (2) |
| ... | | |

TABLE 1-continued

| Class | Flatness of blocks | Filtering strength |
| --- | --- | --- |
| N − 1 | Sharp | Filter parameter (N − 1) |
| N | Very sharp | Filter parameter (N) |

In another example, the restoring unit 430 may select blocks targeted for filtering from among the plurality of blocks, based on the computed flatness. In this example, the restoring unit 430 may filter the selected blocks using a same filter parameter.

Figure 6:
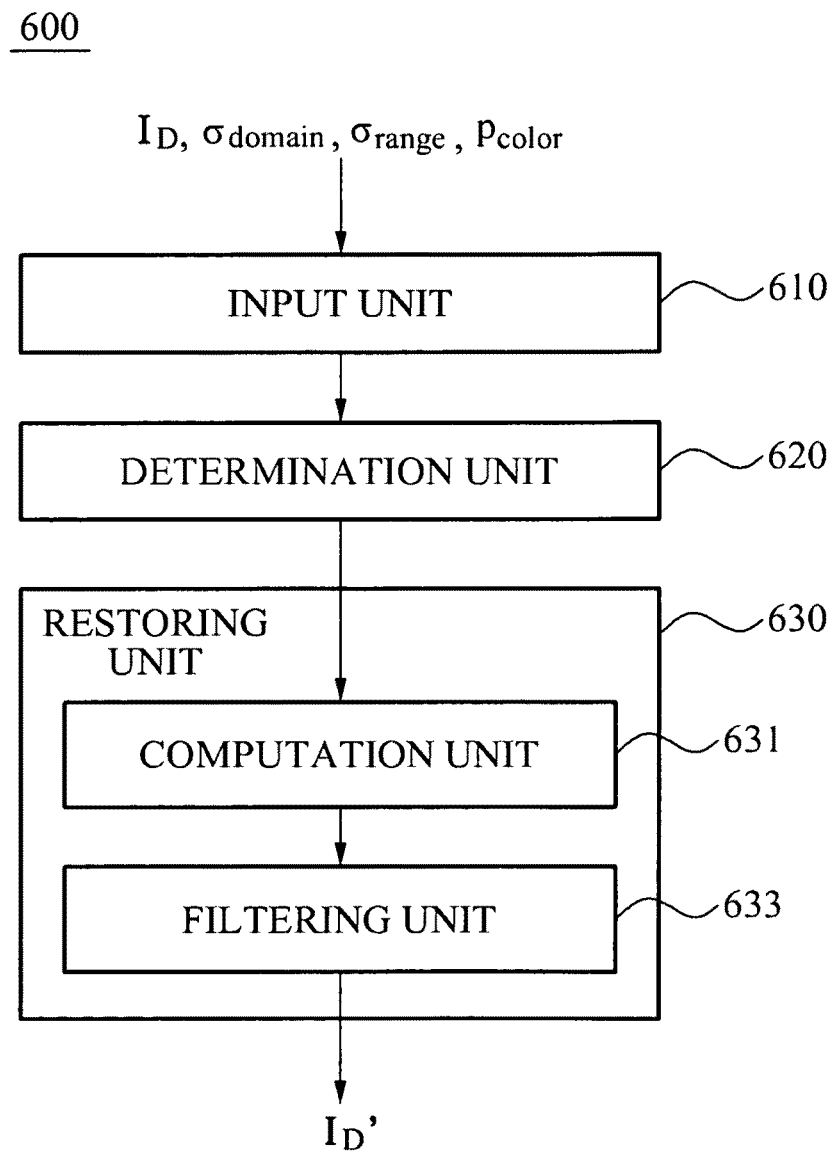
FIG. 6 illustrates a block diagram of an example of a depth image decoding apparatus according to example embodiments.

FIG. 6 illustrates a block diagram of a depth image decoding apparatus 600 according to example embodiments.

The depth image decoding apparatus 600 may decode an input depth image, and may restore the input depth image. To restore the depth image, the depth image decoding apparatus 600 may include an input unit 610, a determination unit 620, and a restoring unit 630.

The input unit 610 may receive an input of filtering parameters used to restore a smooth region and an edge region of the depth image. The received filtering parameters may include a domain variance $\sigma_{domain}$ used to adjust a smoothing strength of the smooth region, a range variance $\sigma_{range}$ used to adjust a smoothing strength of the edge region, and a color parameter $p_{color}$ used to compensate for the smoothing strength of the edge region.

The determination unit 620 may determine a correlation between the depth image and a color image that is matched to the depth image. The determination unit 620 of FIG. 6 may be substantially similar to the determination unit 120 of FIG. 1.

The restoring unit 630 may filter the depth image based on the determined correlation, and may restore the depth image so that the smooth region may be compensated for and that the edge region may be preserved. The restoring unit 630 may include a computation unit 631, and a filtering unit 633.

The computation unit 631 may compute an edge compensation filter coefficient using the color image. The computation unit 631 may also compute a smooth compensation filter coefficient, and an edge preserving filter coefficient, using the filtering parameters. Here, the edge compensation filter coefficient may be used to compensate for the edge region, the smooth compensation filter coefficient may be used to compensate for the smooth region, and the edge preserving filter coefficient may be used to preserve the edge region.

The filtering unit 633 may determine that pixels having a high correlation are highly likely to be pixels of the edge region. Accordingly, the filtering unit 633 may filter the pixels having the high correlation using the edge compensation filter coefficient, the smooth compensation filter coefficient, and the edge preserving filter coefficient. Thus, the edge region of the depth image may be preserved, even after the depth image is restored.

Additionally, the filtering unit 633 may determine that pixels having a low correlation are highly likely to be pixels of the smooth region, and may filter the pixels having the low correlation using the smooth compensation filter coefficient and the edge preserving filter coefficient. Thus, a noise may be removed from the smooth region of the restored depth image.

Figure 7:
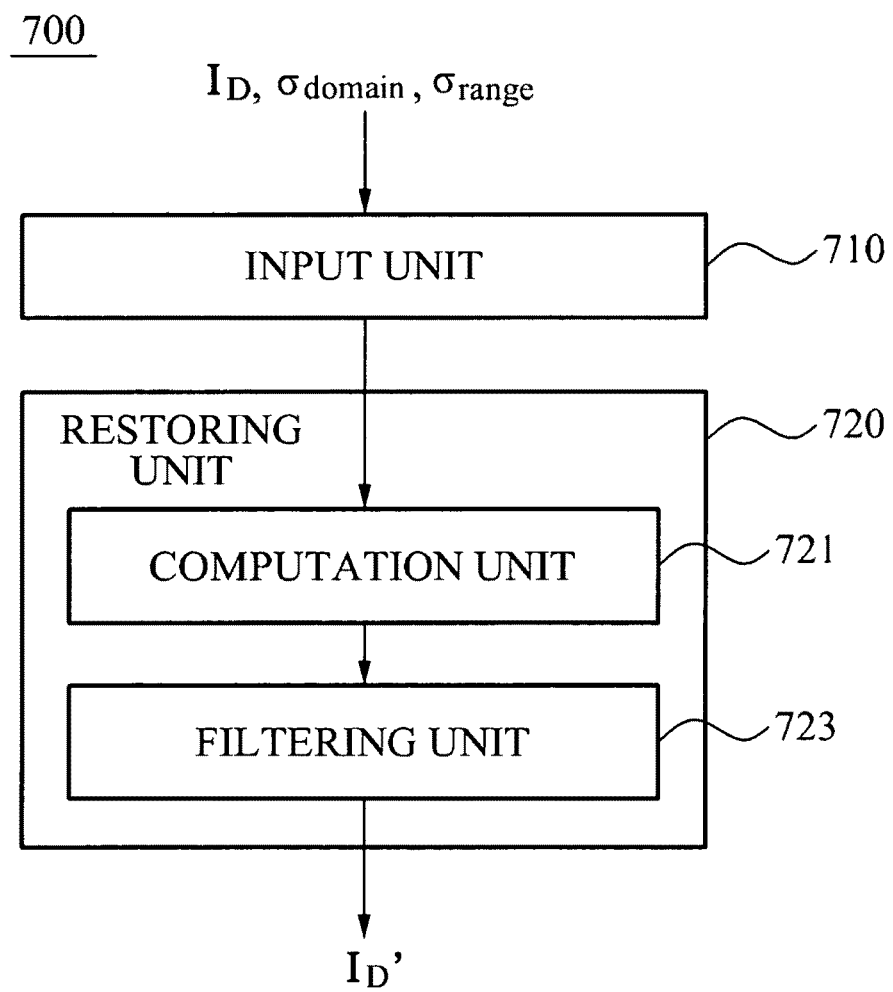
FIG. 7 illustrates a block diagram of another example of a depth image decoding apparatus according to example embodiments.

FIG. 7 illustrates a block diagram of a depth image decoding apparatus 700 according to example embodiments.

The depth image decoding apparatus 700 may decode an input depth image, and may restore the input depth image. To restore the depth image, the depth image decoding apparatus 700 may include an input unit 710, and a restoring unit 720.

The input unit 710 may receive an input of filtering parameters used to restore a smooth region and an edge region of a depth image. The received filtering parameters may include a domain variance $\sigma_{domain}$ used to adjust a smoothing strength of the smooth region, and a range variance $\sigma_{range}$ used to adjust a smoothing strength of the edge region.

The restoring unit 720 may filter the depth image using the received filtering parameters. The restoring unit 720 may include a computation unit 721, and a filtering unit 723.

The computation unit 721 may compute a smooth compensation filter coefficient, and an edge preserving filter coefficient, using the filtering parameters. Here, the smooth compensation filter coefficient may be used to compensate for the depth image, and the edge preserving filter coefficient may be used to preserve the edge region.

The filtering unit 723 may filter the depth image using the computed smooth compensation filter coefficient and the computed edge preserving filter coefficient. Thus, a restored depth image output from the filtering unit 723 may have a preserved edge region, and a smooth region from which noise is removed.

Figure 8:
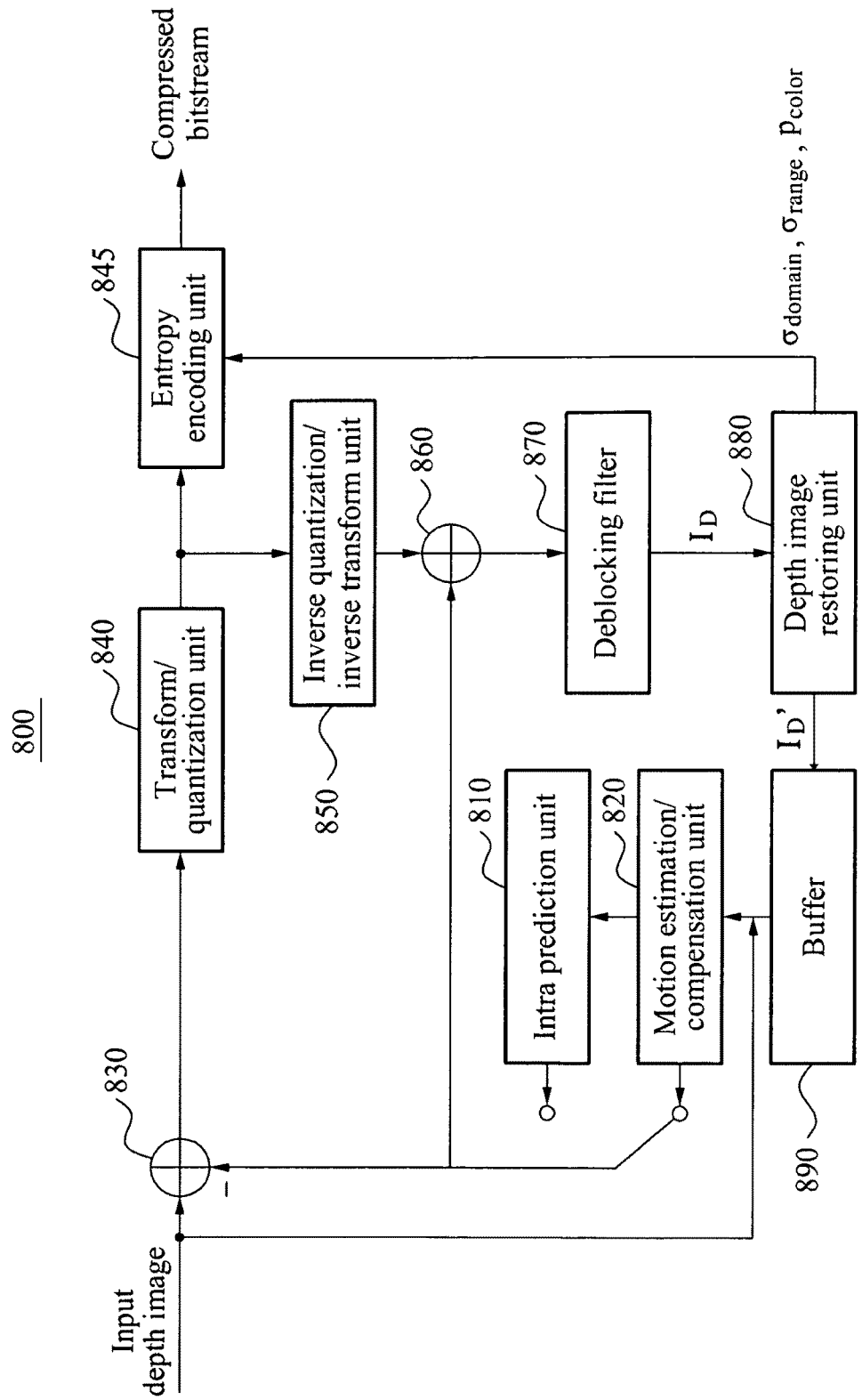
FIG. 8 illustrates a block diagram of an example of a video data encoding apparatus including an apparatus for restoring a depth image according to example embodiments.

FIG. 8 illustrates a block diagram of a video data encoding apparatus 800 including an apparatus for restoring a depth image according to example embodiments.

Referring to FIG. 8, the video data encoding apparatus 800 includes an intra prediction unit 810, a motion estimation/compensation unit 820, a subtraction unit 830, a transform/quantization unit 840, an entropy encoding unit 845, an inverse quantization/inverse transform unit 850, an addition unit 860, a deblocking filter 870, a depth image restoring unit 880, and a buffer 890.

The intra prediction unit 810 may perform intra prediction using reconstructed neighboring pixels in an input depth image. Here, the depth image may be input for each frame, or for each picture.

The motion estimation/compensation unit 820 may estimate a motion vector using a depth image to be encoded, and a depth image that is input in advance, and may generate a predicted block based on the estimated motion vector. Here, the predicted block may be a prediction value of a current block.

A switch S may provide the subtraction unit 830 with a predicted block that is output from the intra prediction unit 810 or from the motion estimation/compensation unit 820.

The subtraction unit 830 may subtract the predicted block from the current block, and may generate a residual block for each macroblock.

The transform/quantization unit 840 may perform an intra prediction encoding or an inter prediction encoding with respect to the current block, based on one of an intra prediction direction determined by the intra prediction unit 810 and an inter prediction predicted by the motion estimation/compensation unit 820. Specifically, the transform/quantization unit 840 may transform the residual block generated by the subtraction unit 830 using a transform scheme, may quantize the transformed residual block, and may generate a quantized transform coefficient. Here, the transform scheme may include, for example, a Discrete Cosine Transform (DCT).

The entropy encoding unit 845 may entropy-encode encoding information such as the quantized transform coefficient, the motion vector, and the like, and may generate a bitstream. The generated bitstream may be a compressed depth image.

The inverse quantization/inverse transform unit 850 may inversely quantize the residual block quantized by the transform/quantization unit 840, may perform an Inverse Discrete Cosine Transform (IDCT) on the inverse-quantized residual block, and may reconstruct the residual block to a state prior to encoding, in order to use the residual block in prediction of a frame that is to be encoded at the next time.

The addition unit 860 may add the reconstructed residual block to the predicted block generated by the motion estimation/compensation unit 820, and may reconstruct the current block prior to encoding.

The deblocking filter 870 may perform filtering of the reconstructed block or the restored depth image, and may remove a blocking phenomenon.

The depth image restoring unit 880 may receive a restored depth image $I_D$ from deblocking filter 870. The depth image restoring unit 880 may determine filtering parameters as described above, and may compensate for an edge region and a smooth region in a depth image, so that the edge region may be preserved and that the smooth region may be more flat. Accordingly, the depth image restoring unit 880 may restore a depth image $I_D'$ as closely as possible to an original depth image input to the subtraction unit 830.

In an example, the depth image restoring unit 880 may compensate for a depth image using the restored depth image and a color image that is matched to the depth image. In this example, the depth image restoring unit 880 may be the depth image encoding apparatus 100 of FIG. 1. In another example, the depth image restoring unit 880 may compensate for a depth image using the restored depth image. In this example, the depth image restoring unit 880 may be the depth image encoding apparatus 300 of FIG. 3.

The depth image restoring unit 880 may provide the determined filtering parameters to the entropy encoding unit 845, and may provide the restored depth image $I_D'$ to the buffer 890.

The buffer 890 may temporarily store the depth image restored by the depth image restoring unit 880, so that the depth image may be used in inter prediction of a next depth image.

Figure 9:
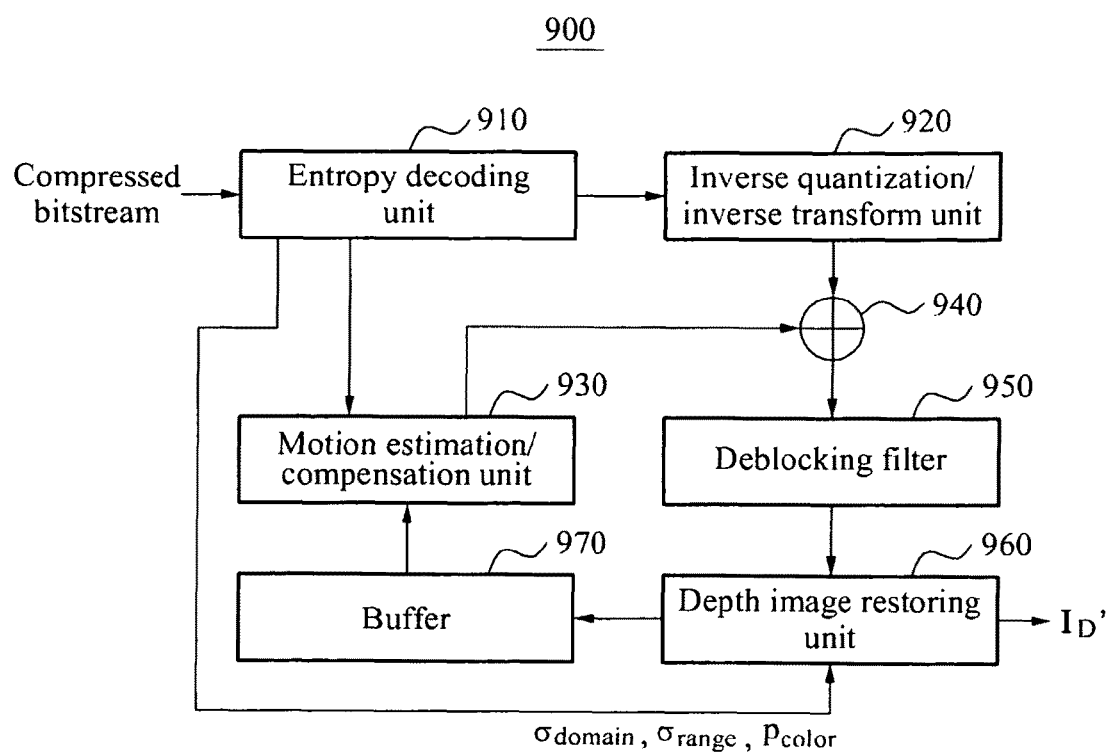
FIG. 9 illustrates a block diagram of another example of a video data decoding apparatus including an apparatus for restoring a depth image according to example embodiments.

FIG. 9 illustrates a block diagram of a video data decoding apparatus 900 including an apparatus for restoring a depth image according to example embodiments.

The video data decoding apparatus 900 may decode a compressed bitstream received from the video data encoding apparatus 800, and may restore a depth image. The video data decoding apparatus 900 may include an entropy decoding unit 910, an inverse quantization/inverse transform unit 920, a motion estimation/compensation unit 930, an addition unit 940, a deblocking filter 950, a depth image restoring unit 960, and a buffer 970.

The entropy decoding unit 910 may entropy-decode the received compressed bitstream, and may extract encoding information, such as a quantized coefficient value of a residual image, and a motion vector, and the like.

The inverse quantization/inverse transform unit 920 may inversely quantize the extracted quantized coefficient value for each macroblock, and may generate a coefficient value of a residual block corresponding to an inverse transform. The inverse quantization/inverse transform unit 920 may perform an IDCT on the generated coefficient value, and may acquire a residual block. Accordingly, the compressed bitstream may be decoded and may be temporarily restored as a depth image.

The motion estimation/compensation unit 930 may generate a predicted block of the current block using the motion vector extracted by the entropy decoding unit 910.

The addition unit 940 may add the residual block to the predicted block, and may restore the depth image. Here, the addition unit 940 may receive the residual block from the inverse quantization/inverse transform unit 920, and may receive the predicted block from the motion estimation/compensation unit 930.

The deblocking filter 950 may perform filtering of the depth image restored by the addition unit 940, and may remove the blocking phenomenon.

The depth image restoring unit 960 may receive a restored depth image $I_D$ from the deblocking filter 950. The depth image restoring unit 960 may compensate for an edge region and a smooth region in a depth image, so that the edge region may be preserved and that the smooth region may be more flat. Accordingly, the depth image restoring unit 960 may restore a depth image $I_D'$ as closely as possible to an original depth image input the subtraction unit 830.

In an example, the depth image restoring unit 960 may compensate for a depth image using the restored depth image and a color image that is matched to the depth image. In this example, the depth image restoring unit 960 may be the depth image encoding apparatus 100 of FIG. 1. In another example, the depth image restoring unit 960 may compensate for a depth image using the restored depth image. In this example, the depth image restoring unit 960 may be the depth image encoding apparatus 300 of FIG. 3.

The buffer 970 may temporarily store the depth image restored by the depth image restoring unit 960, so that the depth image may be used in inter prediction of a next depth image.

Figure 10:
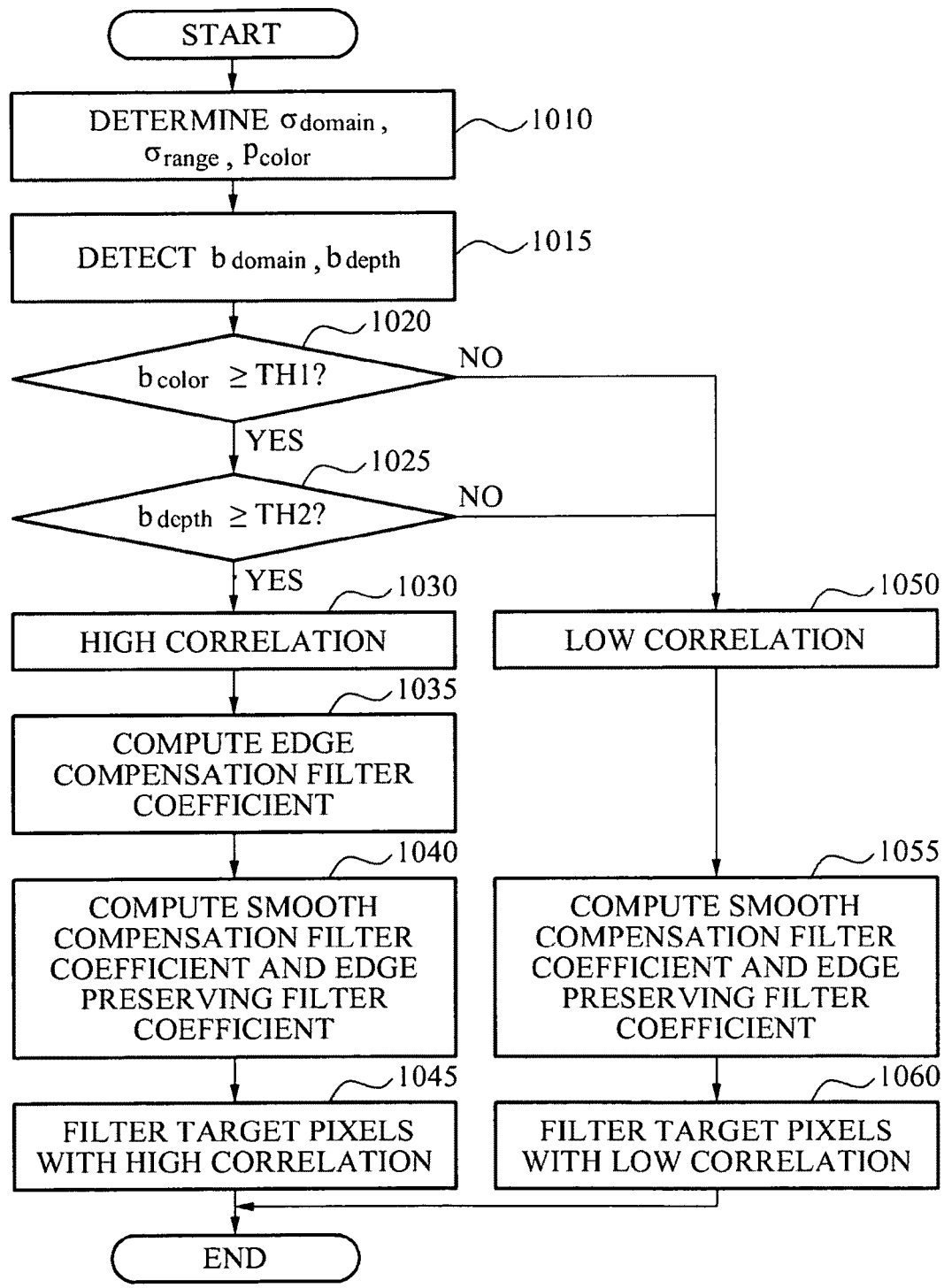
FIG. 10 illustrates a flowchart of an example of a depth image restoration method of a depth image encoding apparatus according to example embodiments.

FIG. 10 illustrates a flowchart of an example of a depth image restoration method of a depth image encoding apparatus according to example embodiments.

The depth image restoration method of FIG. 10 relates to a method of restoring a depth image using the depth image and a color image, may be performed by the depth image encoding apparatus 100 of FIG. 1, or by the video data encoding apparatus 800 of FIG. 8.

In operation 1010, the depth image encoding apparatus may determine filtering parameters used to restore the depth image. Here, the depth image may be compressed by the depth image encoding apparatus, and may be decompressed. The determined filtering parameters may be provided to the depth image decoding apparatus 700 of FIG. 7.

The filtering parameters may include a domain variance $\sigma_{domain}$ used to adjust a smoothing strength of a smooth region of the depth image, a range variance $\sigma_{range}$ used to adjust a smoothing strength of an edge region of the depth image, and a color parameter $p_{color}$ used to compensate for the smoothing strength of the edge region.

In operation 1015, the depth image encoding apparatus may detect a color boundary strength $b_{color}$ and a depth boundary strength $b_{depth}$ of target pixels of the depth image that are to be currently processed, respectively, from the color image and the depth image.

In operation 1020, the depth image encoding apparatus may compare the detected color boundary strength $b_{color}$ with the first threshold TH1.

When the color boundary strength $b_{color}$ is equal to or greater than the first threshold TH1, the depth image encoding apparatus may compare the depth boundary strength $b_{depth}$ with the second threshold TH2 in operation 1025.

When the depth boundary strength $b_{depth}$ is equal to or greater than the second threshold TH2, the depth image encoding apparatus may determine that a pixel at the coordinate (x, y) of the depth image has a high correlation to a pixel at the coordinate (x, y) of the color image in operation 1030. There is a high probability that pixels determined to have high correlation are pixels of an edge region.

In operation 1035, the depth image encoding apparatus may compute an edge compensation filter coefficient used to compensate for the edge region, when the correlation is determined to be high.

In operation 1040, the depth image encoding apparatus may compute a smooth compensation filter coefficient and an edge preserving filter coefficient, using the filtering parameters. Here, the smooth compensation filter coefficient may be used to compensate for the smooth region, and the edge preserving filter coefficient may be used to preserve the edge region.

In operation 1045, the depth image encoding apparatus may filter target pixels with high correlation using the edge compensation filter coefficient, the smooth compensation filter coefficient and the edge preserving filter coefficient. There is a high probability that the filtered target pixels are pixels of the edge region. Accordingly, the compensated edge region may be preserved, rather than being blurred.

When the correlation is determined to be low, the depth image encoding apparatus may determine that the target pixels correspond to the smooth region in operation 1050.

In operation 1055, the depth image encoding apparatus may compute a smooth compensation filter coefficient and an edge preserving filter coefficient, using the determined filtering parameters.

In operation 1060, the depth image encoding apparatus may filter target pixels with low correlation using the smooth compensation filter coefficient and the edge preserving filter coefficient. Thus, a compression noise of the target pixels may be removed, and the target pixels may be compensated for and restored as the smooth region.

Figure 11:
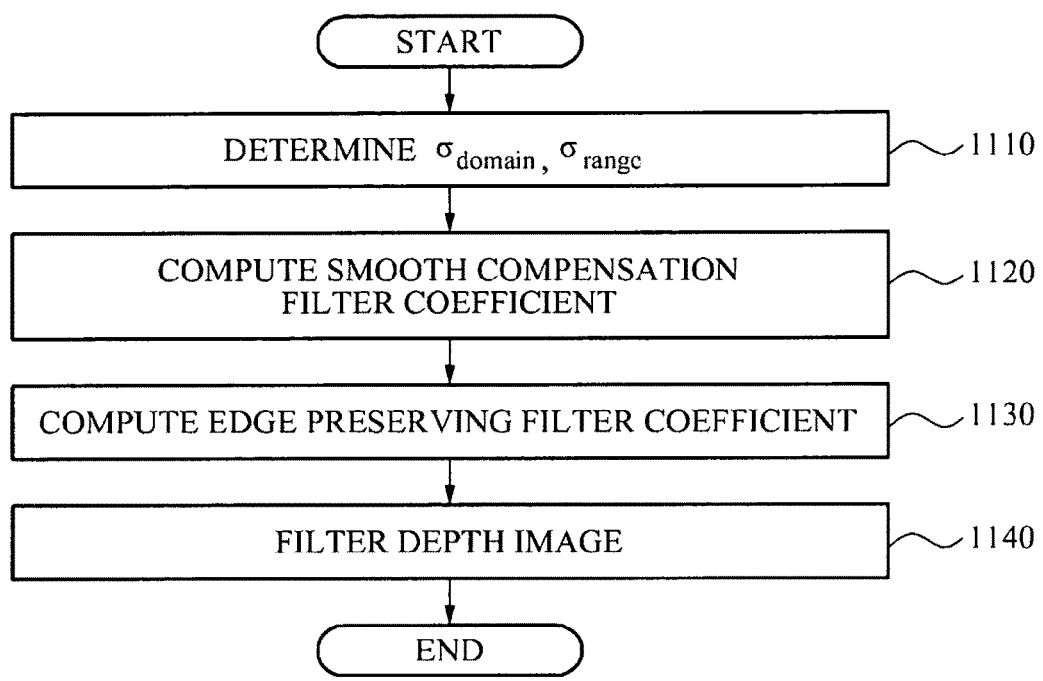
FIG. 11 illustrates a flowchart of another example of a depth image restoration method of a depth image encoding apparatus according to example embodiments.

FIG. 11 illustrates a flowchart of another example of a depth image restoration method of a depth image encoding apparatus according to example embodiments.

The depth image restoration method of FIG. 11 relates to a method of restoring a depth image without using a color image, and may be performed by the depth image encoding apparatus 300 of FIG. 3, or by the video data encoding apparatus 800 of FIG. 8.

In operation 1110, the depth image encoding apparatus may determine filtering parameters used to restore the depth image. The determined filtering parameters may be provided to the depth image decoding apparatus 700 of FIG. 7, and may include a domain variance $\sigma_{domain}$ used to adjust a smoothing strength of a smooth region of the depth image, and a range variance a $\sigma_{range}$ used to adjust a smoothing strength of an edge region of the depth image.

In operation 1120, the depth image encoding apparatus may compute a smooth compensation filter coefficient, using the determined filtering parameters.

In operation 1130, the depth image encoding apparatus may compute an edge preserving filter coefficient for preserving the edge region, using the determined filtering parameters.

In operation 1140, the depth image encoding apparatus may filter the depth image using the smooth compensation filter coefficient and the edge preserving filter coefficient, so that the edge region of the depth image may be preserved.

Figure 12:
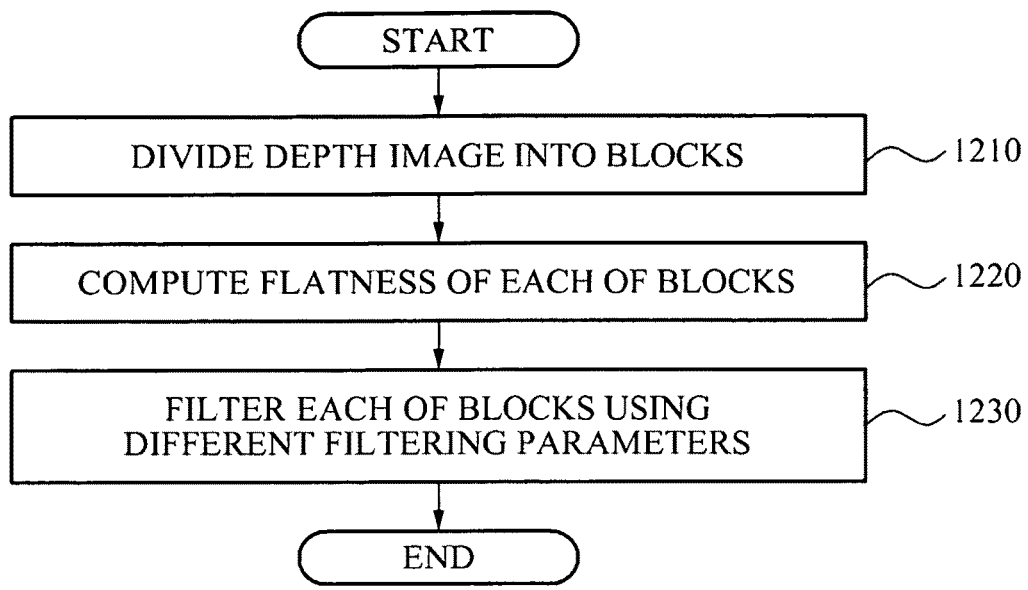
FIG. 12 illustrates a flowchart of still another example of a depth image restoration method of a depth image encoding apparatus according to example embodiments.

FIG. 12 illustrates a flowchart of still another example of a depth image restoration method of a depth image encoding apparatus according to example embodiments.

The depth image restoration method of FIG. 12 may be performed by the depth image encoding apparatus 400 of FIG. 4.

In operation 1210, the depth image encoding apparatus may divide a depth image into a plurality of blocks. For example, the depth image may be divided into macroblocks.

In operation 1220, the depth image encoding apparatus may compute a flatness of each of the plurality of blocks.

In operation 1230, the depth image encoding apparatus may filter each of the plurality of blocks using different filtering parameters, based on the computed flatness. In other words, the depth image encoding apparatus may apply different filtering strengths based on the computed flatness.

Figure 13:
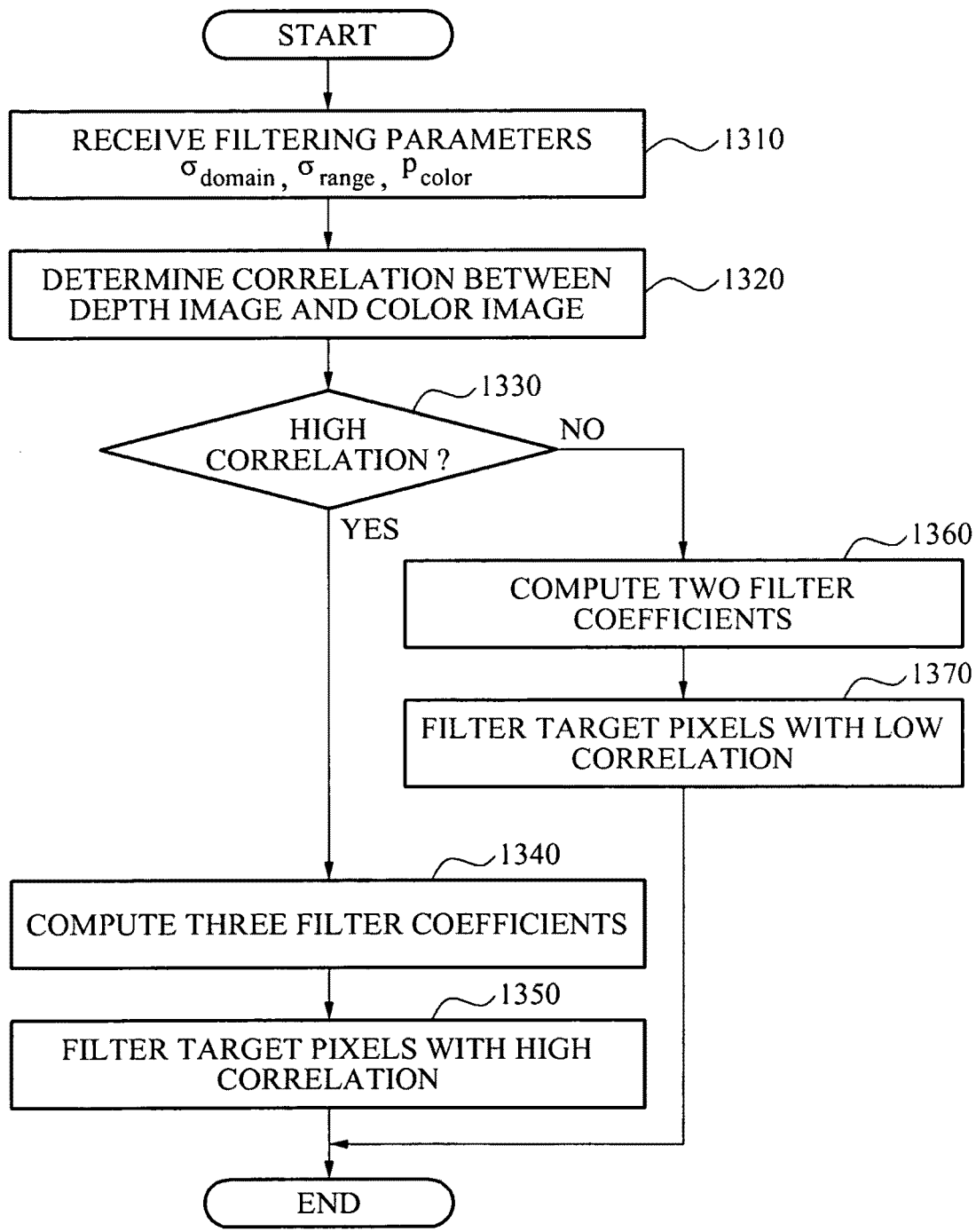
FIG. 13 illustrates a flowchart of an example of a depth image restoration method of a depth image decoding apparatus according to example embodiments.

FIG. 13 illustrates a flowchart of an example of a depth image restoration method of a depth image decoding apparatus according to example embodiments.

The depth image restoration method of FIG. 13 relates to a method of restoring a depth image using the depth image and a color image, may be performed by the depth image decoding apparatus 600 of FIG. 6, or by the video data decoding apparatus 900 of FIG. 9.

In operation 1310, the depth image decoding apparatus may receive an input of filtering parameters used to restore a depth image. The received filtering parameters may include a domain variance $\sigma_{domain}$ used to adjust a smoothing strength of a smooth region of the depth image, a range variance $\sigma_{range}$ used to adjust a smoothing strength of an edge region of the depth image, and a color parameter $p_{color}$ used to compensate for the smoothing strength of the edge region.

In operation 1320, the depth image decoding apparatus may determine a correlation between the depth image and a color image that is matched to the depth image. For example, the depth image decoding apparatus may detect a color boundary strength $b_{color}$ and a depth boundary strength $b_{depth}$ of target pixels of the depth image that are to be currently processed, respectively, from the color image and the depth image, may compare a threshold with the detected color boundary strength $b_{color}$, the detected depth boundary strength $b_{depth}$, and may determine the correlation.

When the correlation is determined to be high in operation 1330, the depth image decoding apparatus may compute three filter coefficients, for example an edge compensation filter coefficient, a smooth compensation filter coefficient, and an edge preserving filter coefficient in operation 1340.

In operation 1350, the depth image decoding apparatus may filter target pixels with high correlation using the edge compensation filter coefficient, the smooth compensation filter coefficient and the edge preserving filter coefficient.

When the correlation is determined to be low in operation 1330, the depth image decoding apparatus may compute two filter coefficients, for example a smooth compensation filter coefficient and an edge preserving filter coefficient in operation 1360.

In operation 1370, the depth image decoding apparatus may filter target pixels with low correlation using the smooth compensation filter coefficient and the edge preserving filter coefficient.

Figure 14:
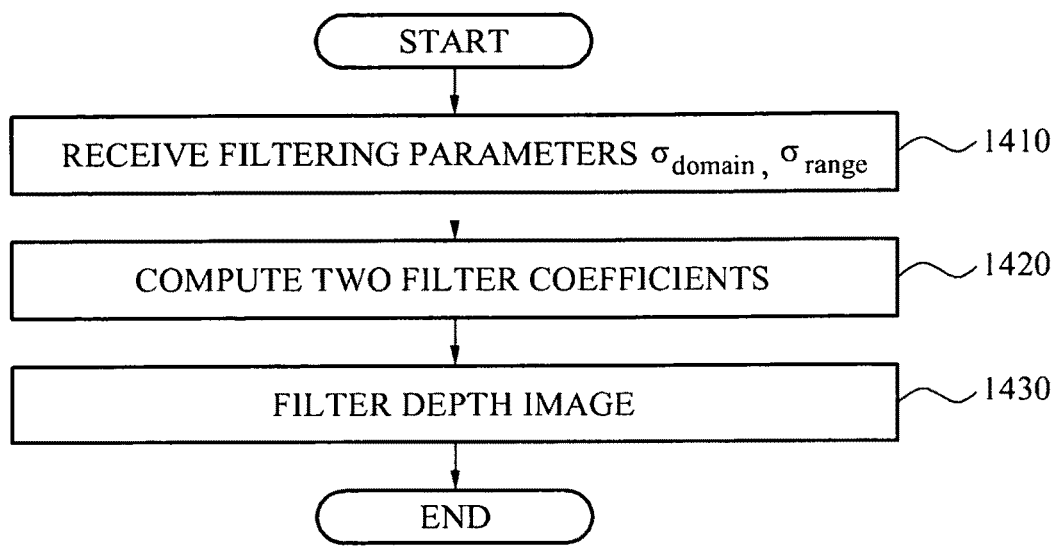
FIG. 14 illustrates a flowchart of another example of a depth image restoration method of a depth image decoding apparatus according to example embodiments.

FIG. 14 illustrates a flowchart of another example of a depth image restoration method of a depth image decoding apparatus according to example embodiments.

The depth image restoration method of FIG. 14 relates to a method of restoring a depth image without using a color image, and may be performed by the depth image decoding apparatus 700 of FIG. 7, or by the video data decoding apparatus 900 of FIG. 9.

In operation 1410, the depth image decoding apparatus may receive an input of filtering parameters used to restore a depth image. The filtering parameters may be received from the depth image decoding apparatus 600 of FIG. 6, and may include a domain variance $\sigma_{domain}$ used to adjust a smoothing strength of a smooth region of the depth image, and a range variance a $\sigma_{range}$ used to adjust a smoothing strength of an edge region of the depth image.

In operation 1420, the depth image decoding apparatus may compute two filter coefficients, for example a smooth compensation filter coefficient, and an edge preserving filter coefficient, using the filtering parameters.

In operation 1430, the depth image decoding apparatus may filter the depth image using the smooth compensation filter coefficient and the edge preserving filter coefficient, so that the edge region of the depth image may be preserved.

The methods according to the above-described example embodiments may be recorded in non-transitory computer-readable media including program instructions to implement the various operations by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A depth image decoding apparatus, comprising:
    an input unit to receive an input of filtering parameters, the filtering parameters being used to restore a smooth region and an edge region of a depth image;
    a determination unit to determine a correlation between the depth image and a color image, the color image being matched to the depth image; and
    a restoring unit to filter the depth image based on the determined correlation, and to compensate for and restore the smooth region and the edge region,
    wherein the restoring unit filters the edge region using the received filtering parameters.

2. The depth image decoding apparatus of claim 1, wherein the filtering parameters comprises a domain variance used to adjust a smoothing strength of the smooth region, a range variance used to adjust a smoothing strength of the edge region, and a color parameter used to compensate for the smoothing strength of the edge region.

3. The depth image decoding apparatus of claim 1, wherein the restoring unit comprises:
    a computation unit to compute an edge compensation filter coefficient using the color image, and to compute a smooth compensation filter coefficient and an edge preserving filter coefficient using the filtering parameters, the edge compensation filter coefficient being used to compensate for the edge region, the smooth compensation filter coefficient being used to compensate for the smooth region, and the edge preserving filter coefficient being used to preserve the edge region; and
    a filtering unit to filter the edge region using the computed edge compensation filter coefficient, the computed smooth compensation filter coefficient, and the computed edge preserving filter coefficient.

4. A depth image decoding apparatus, comprising:
    an input unit to receive an input of filtering parameters, the filtering parameters being used to restore a smooth region and an edge region of a depth image; and
    a restoring unit to filter the depth image using the received filtering parameters, and to compensate for and restore the smooth region and the edge region,
    wherein an edge is preserved.

5. The depth image decoding apparatus of claim 4, wherein the received filtering parameters comprises a domain variance used to adjust a smoothing strength of the smooth region, and a range variance used to adjust a smoothing strength of the edge region.

* * * * *